United States Patent [19]
Cava

[11] Patent Number: 6,130,772
[45] Date of Patent: Oct. 10, 2000

[54] ELECTROCHROMIC DEVICE AND METHOD

[76] Inventor: Frank James Cava, 524 El Camino Real, Apt. 14, Burlingame, Calif. 94010

[21] Appl. No.: 09/089,297

[22] Filed: Jun. 1, 1998

Related U.S. Application Data
[60] Provisional application No. 60/048,839, Jun. 6, 1997.

[51] Int. Cl.[7] .................................................. G02F 1/153
[52] U.S. Cl. ........................... 359/270; 359/265; 359/275
[58] Field of Search ................................ 359/265, 270, 359/275; 351/49, 44

[56] References Cited

U.S. PATENT DOCUMENTS

| | | | |
|---|---|---|---|
| 4,968,127 | 11/1990 | Russell et al. | 351/44 |
| 5,377,037 | 12/1994 | Branz et al. | 359/265 |
| 5,384,653 | 1/1995 | Benson et al. | 359/270 |
| 5,923,028 | 7/1999 | Turnbull et al. | 250/214 |

*Primary Examiner*—Georgia Epps
*Assistant Examiner*—Suzanne Letendre
*Attorney, Agent, or Firm*—Flehr Hohbach Test Albritton & Herbert LLP

[57] ABSTRACT

Electrochromic device and method. In one disclosed embodiment, an electrochromic coating is applied to a light transmissive substrate, and a first control voltage is generated in accordance with the amount of light impinging upon the substrate. That control voltage is applied to the electrochromic coating to decrease the transmittance of the substrate as the light increases. Ambient light conditions are monitored to provide a second control voltage which is applied to the electrochromic coating to decrease the transmittance of the substrate when the ambient light falls below a predetermined level, e.g. at night. In other disclosed embodiments, the electrochromic coating is applied to the lenses of a pair of glasses and to a lamp shade, with photovoltaic cells for controlling the transmittance of the coating in accordance with the amount of impinging light.

6 Claims, 2 Drawing Sheets

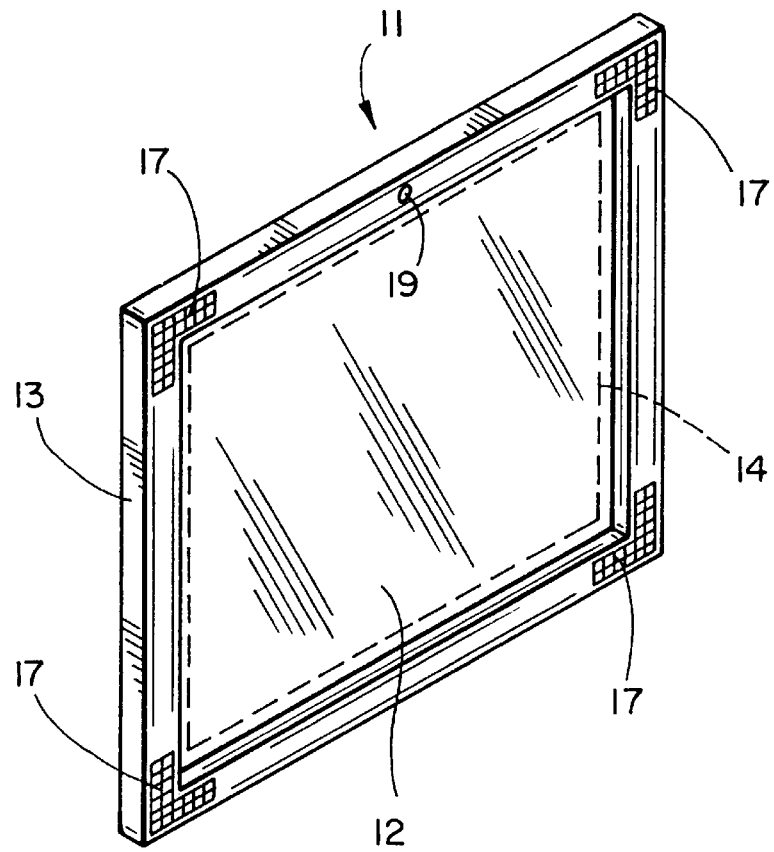
FIG_1
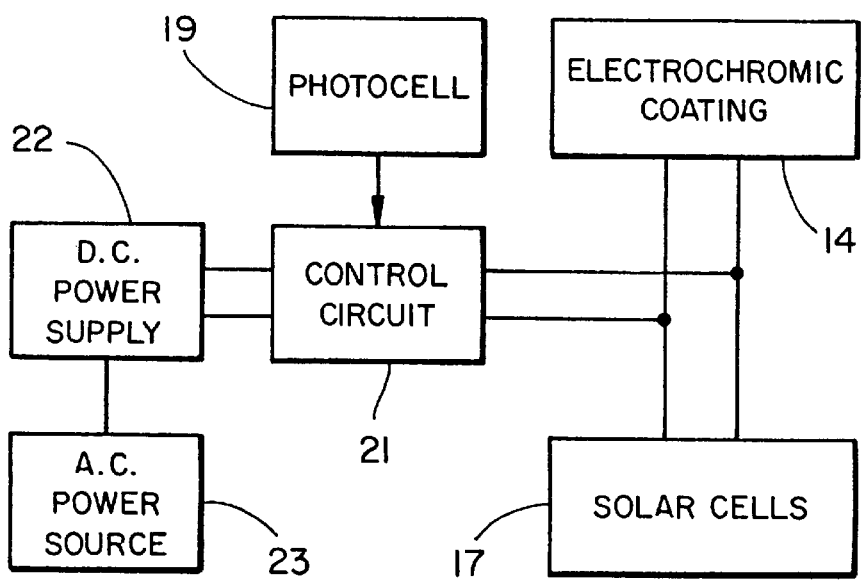
FIG_2

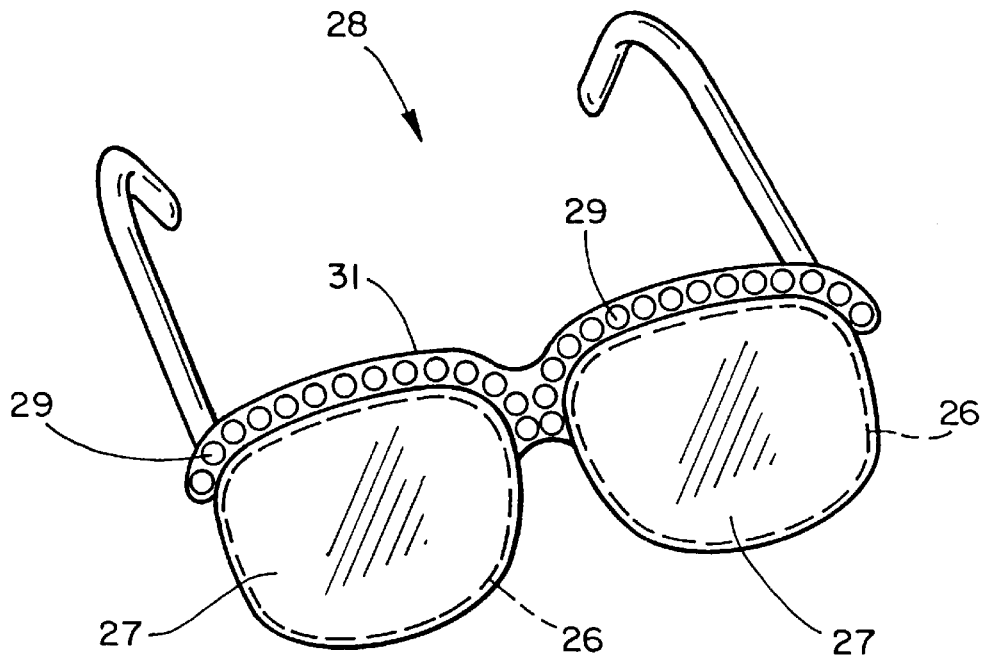
FIG_3
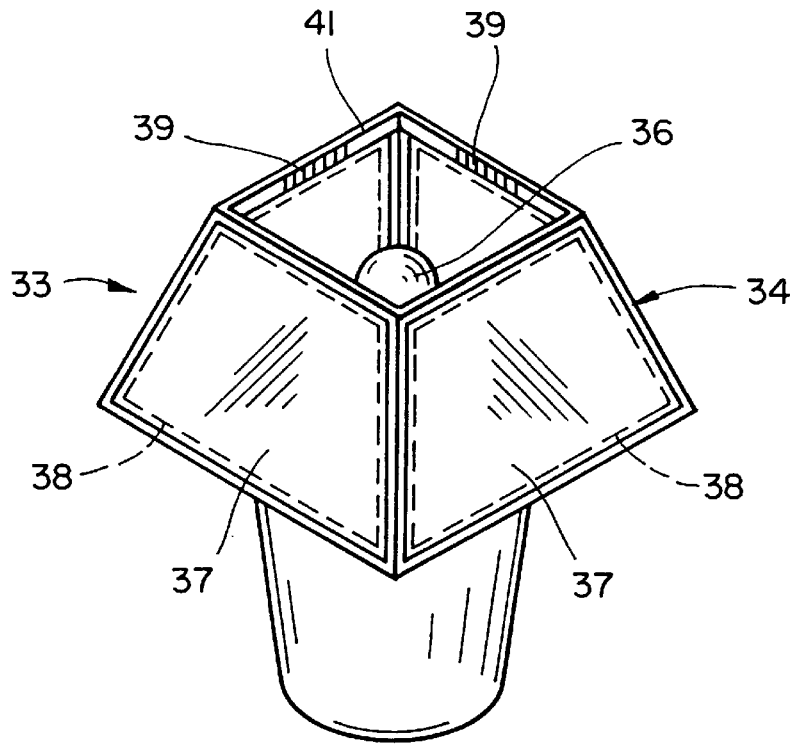
FIG_4

ELECTROCHROMIC DEVICE AND METHOD

This is based upon Provisional Application No. 60/048,839, filed Jun. 6, 1997.

This invention pertains generally to controlled transmittance of light through a transparent panel and, more particularly, to an electrochromic device and method.

Heretofore, there have been some attempts to control the transmittance of light through window panes. U.S. Pat. No. 4,768,865, for example, discloses a conventional electrochromic coating on a window which is between higher and lower transmittance states by the application of an electric field, and U.S. Pat. No. 4,832,468 discloses the use of an electrochromic coating for darkening automobile windows. Both of these systems require external power supplies to produce the electric fields required for changing the transmittance of the electrochromic coating.

U.S. Pat. No. 5,384,653 discloses a stand-alone electrochromic window in which an array of photovoltaic cells produce the electric power for varying the transmittance of the window to control both the amount of light and the amount of heat energy passing through the window. A battery is connected in parallel with the photovoltaic cells, with a switch for manual override.

It is in general an object of the invention to provide a new and improved electrochromic device and method.

Another object of the invention is to provide an electrochromic device and method of the above character which overcome the limitations and disadvantages of the prior art.

These and other objects are achieved in accordance with one embodiment of the invention by providing an electrochromic device and method in which an electrochromic coating is applied to a light transmissive substrate, and a first control voltage is generated in accordance with the amount of light impinging upon the substrate. That control voltage is applied to the electrochromic coating to decrease the transmittance of the substrate as the light increases. Ambient light conditions are monitored to provide a second control voltage which is applied to the electrochromic coating to decrease the transmittance of the substrate when the ambient light falls below a predetermined level, e.g. at night. In other disclosed embodiments, the electrochromic coating is applied to the lenses of a pair of glasses and to a lamp shade, with photovoltaic cells for controlling the transmittance of the coating in accordance with the amount of impinging light.

FIG. 1 is an isometric view of one embodiment of an electrochromic window system according to the invention.

FIG. 2 is a block diagram of the window system of FIG. 1.

FIG. 3 is an isometric view of a pair of sunglasses with lenses having electrochromically controlled light transmittance in accordance with the invention.

FIG. 4 is an isometric view, partly broken away, of a lamp having a shade with electrochromically controlled light transmittance in accordance with the invention.

FIG. 1, the invention is illustrated in connection with a window 11 in which a panel 12 of glass or other suitable transparent material is mounted in a frame 13, with an electrochromic coating 14 on one surface of the panel for controlling the amount of light passing through the window. The electrochromic coating is of conventional design, and has input terminals in the form of bus bars 16 to which a control voltage is applied.

A plurality of photovoltaic solar cells 17 are mounted on the frame toward the corners of the window. These cells are of conventional design, and produce a voltage corresponding to the amount of sunlight impinging thereon. In one presently preferred embodiment the cells are fully encapsulated single crystalline silicon solar cells, but cells of any suitable design can be used.

The solar cells are connected together in a series/parallel array to provide a voltage for controlling the transmittance of the electrochromic coating. That voltage is applied to the input terminals or bus bars of the coating.

The transmittance of the window is thus controlled in accordance with the level of the impinging sunlight or solar energy. As the sunlight increases, the voltage produced by the cells also increases, and that causes the transmittance of the coating to decrease so that the window becomes more opaque, thereby reducing the amount of light passing through it. As the sunlight decreases, the voltage from the cells also decreases, and the window becomes more transmissive.

Means is also provided for automatically switching the window to its least transmissive state when the impinging light drops below a predetermined level, e.g. at night. This means includes a photocell 19 which is mounted on the outer side of the frame toward the top of the window for monitoring ambient light conditions. The photocell is connected to a control circuit 21 which controls the application of power from a D.C. power source 22 to the input terminals of the electrochromic coating. In the embodiment illustrated, the power source is an A.C. operated device which receives operating power from a 120 volt source 23 such as a standard wall outlet.

Operation and use of the embodiment of FIG. 1, and therein the method of the invention, is as follows. During daylight hours, sunlight impinging upon solar cells 17 produces a control voltage which is applied to electrochromic coating 14 to vary the transmittance of the window. As the light becomes brighter, the window become more opaque, and as the light becomes dimmer, the window becomes more transmissive. The sunlight impinging upon photocell 19 maintains control circuit 21 in an OFF state so that no power is applied to the electrochromic coating from D.C. power source 22.

When the ambient light impinging on the photocell decreases to a certain level, as for example happens when the sun goes down, the photocell causes the state of control circuit 21 to change so that power is now applied to the electrochromic coating from the D.C. source. That causes the coating to darken and remain at its fullest level of opacity until the ambient light once again increases to the level determined by the photocell. At that point the control circuit disconnects the D.C. source from the coating, and the transmittance of the window is once again controlled by the amount of sunlight impinging upon the cells.

In the embodiment of FIG. 3, electrochromic coatings 26 are applied to the lenses 27 of a pair of sunglasses 28 to control the amount of light passing through the lenses. A plurality of photovoltaic cells 29 are mounted on the frame 31 of the glasses, facing in a forward direction above the lenses and on the nose piece of the frame. These cells are connected in a series/parallel array to provide an output voltage which is applied to the electrochromic coatings to control the amount of light passing through the lenses.

As the amount of sunlight impinging on the cells increases, the output voltage increases, and the increased voltage makes the coatings more opaque. As the sunlight dims, the voltage decreases, and the coatings become more transparent.

Since the level of the voltage applied to the coatings is, in part, dependent upon the number of cells in the array, the maximum opacity of the coatings can be controlled by the number of cells employed in the array.

In FIG. 4, the invention is illustrated in connection with a lamp 33 having a shade 34 with a transmittance which changes when the lamp is turned on. In the embodiment illustrated, the lamp has an incandescent bulb 36, and the shade has a plurality of trapazoidally shaped panels 37 disposed about the bulb. The panels are fabricated of a transparent or translucent material such as glass of plastic, and have electrochromic coatings 38 on one surface thereof.

A plurality of photovoltaic cells 39 are mounted on the frame 41 of the shade, above the panels, facing inwardly toward the light bulb. These cells are connected to the coatings on the panels to control the transmittance of the coatings. Alternatively, the cells can be mounted above the bulb on the mounting arms of the frame (not shown), or on the harp or finial (not shown).

When the lamp is turned off, the output from the cells is substantially zero, and the shade is at its maximum transparency. When the lamp is turned on, light from the bulb causes the cells to produce a voltage which darkens the panels and shades the region outside the lamp shade from the glare of the bulb. When the lamp is turned off, the shade returns to the state of minimum opacity or maximum transmittance.

It is apparent from the foregoing that a new and improved electrochromic device and method have been provided. While only certain presently preferred embodiments have been described in detail, as will be apparent to those familiar with the art, certain changes and modifications can be made without departing from the scope of the invention as defined by the following claims.

What is claimed is:

1. An electrochromic device, comprising a light transmissive substrate, an electrochromic coating on the substrate for varying the transmittance of the substrate in accordance with an applied voltage, a photovoltaic cell for applying a first control voltage to the electrochromic coating in response to light impinging upon the cell so that the transmittance of the substrate decreases as the light becomes brighter, and means responsive to ambient light conditions for applying a second control voltage to the electrochromic coating to reduce the transmittance of the substrate when the ambient light falls below a predetermined level.

2. The electrochromic device of claim 1 wherein the means for applying the second control voltage comprises a photocell for monitoring the ambient light, a power source, and means responsive to the photocell for connecting the power source to the coating.

3. An electrochromic device, comprising a light bulb, a lamp shade having a light transmissive panel disposed in proximity to the light bulb, an electrochromic coating on the panel for controlling the transmittance of the panel in accordance with a control voltage applied to the coating, and a photovoltaic cell responsive to light from the bulb for applying a control voltage to the coating to decrease the transmittance of the panel when the bulb is turned on.

4. A method of controlling light transmittance, comprising the steps of: applying an electrochromic coating to a light transmissive substrate, providing a first control voltage corresponding to the amount of light impinging upon the substrate, applying the first control voltage to the electrochromic coating to decrease the transmittance of the substrate as the light increases, monitoring ambient light conditions, and applying a second control voltage to the electrochromic coating to decrease the transmittance of the substrate when the ambient light falls below a predetermined level.

5. The method of claim 4 wherein the ambient light conditions are monitored with a photocell, and the second control voltage is applied to the electrochromic coating from a power source in response to a signal from the photocell.

6. An electrochromic device, comprising a light bulb, a lamp shade having a light transmissive panel disposed in proximity to the light bulb, an electrochromic coating on the panel for controlling the transmittance of the panel in accordance with a control voltage applied to the coating, and means responsive to light from the bulb for applying a control voltage to the coating to decrease the transmittance of the panel when the bulb is turned on.

* * * * *